LASER ACTUATED CURIE POINT RECORDING AND READOUT SYSTEM

Filed Oct. 22, 1964

INVENTORS
L.D. McGLAUCHLIN
J.F. READY
BY Robert O. Vidas
ATTORNEY

United States Patent Office 3,368,209

Patented Feb. 6, 1968

3,368,209

LASER ACTUATED CURIE POINT RECORDING AND READOUT SYSTEM

Laurence D. McGlauchlin, Edina, and John F. Ready, Minneapolis, Minn., assignors to Honeywell Inc., Minneapolis, Minn., a corporation of Delaware Filed Oct. 22, 1964, Ser. No. 405,806
6 Claims. (Cl. 340—174.1)

ABSTRACT OF THE DISCLOSURE

An information storage and retrieval system utilizing a selectively modulated and deflected laser beam to heat discrete portions of a thin magnetic material above the Curie temperature for altering magnetization direction therein and permitting storage of information. The system retrieves stored information by attenuating the laser beam to permit non-destructive read-out using the Faraday or Kerr effect.

Figures 1, 2:
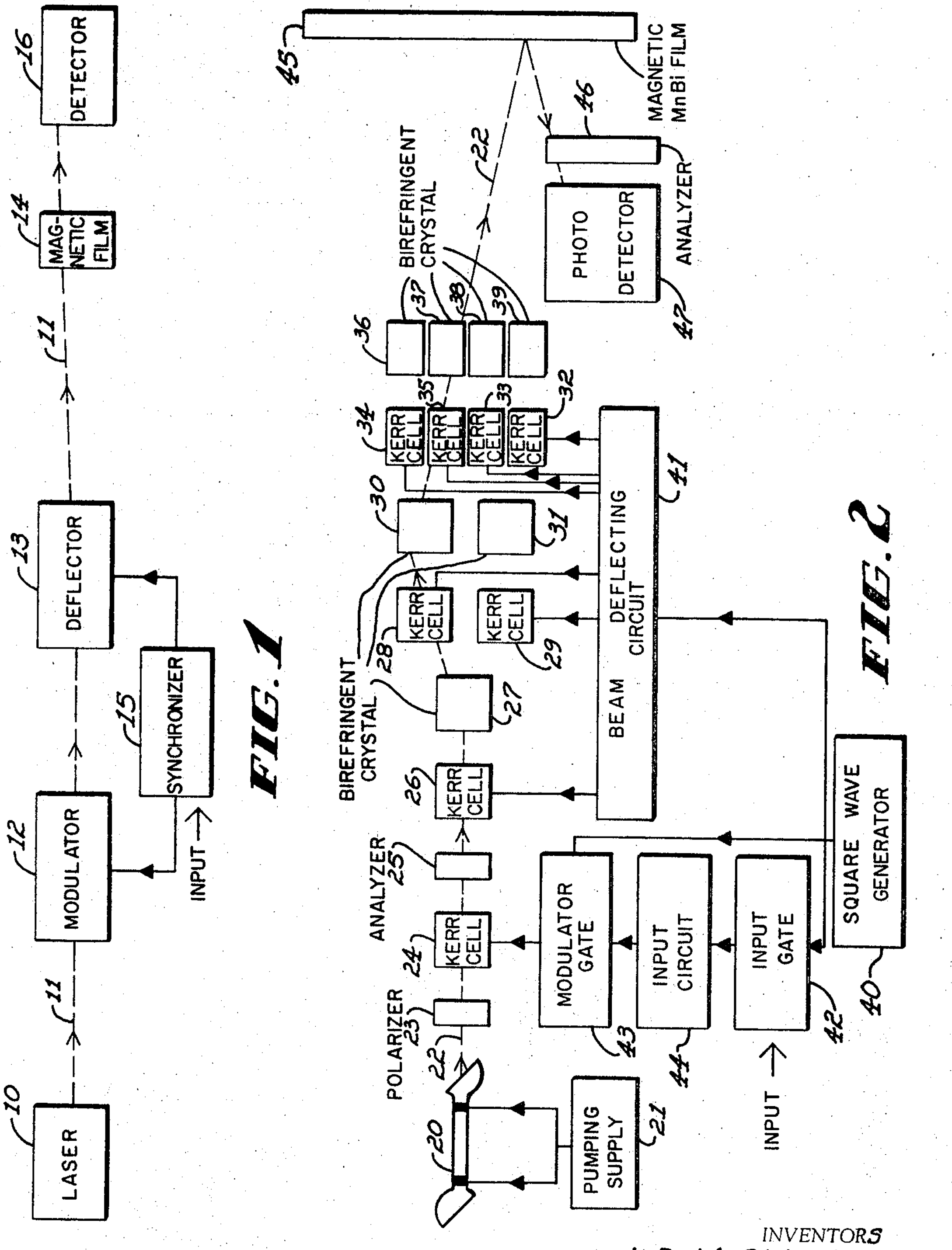

The present invention is directed to a laser apparatus, and more particularly, to a system for storing and retrieving information on a ferromagnetic material utilizing a laser beam.

The present invention utilizes Curie point writing of information on a thin magnetic film. The Curie point, or Curie temperature, is a temperature above which a ferromagnetic material becomes non-magnetic. Upon cooling to a temperature below the Curie point, such material returns to the ferromagnetic state. Prior art schemes have suggested the use of Curie point writing for information storage and retrieval. However, these schemes have been subject to severe practical limitations.

Curie point writing schemes utilize a thin magnetic film wherein the magnetic vectors representing the magnetization direction of individual portions of the film have been prealigned parallel to one another by exposure of the film to a strong magnetic field. Heat is applied to a small first portion of the film to raise that portion to a temperature above the Curie point. The first portion then temporarily loses its magnetic characteristics. The heat is removed, and the portion cools. A magnetic field, created by the magnetization direction of a portion surrounding the first portion, causes it to assume a magnetization direction with an associated magnetic vector aligned anti-parallel to that of the surrounding portion. Thus, binary information may be stored in the first portion by allowing the magnetic vector to remain aligned parallel to that of the surrounding portion or by causing the vector to be switched to an anti-parallel alignment.

Readout of information stored in such a film has been accomplished by shining linearly polarized light on the film surface at the portion in which information is stored. Light shined on the portion is either reflected or transmitted depending upon the thickness of the film and the type of system used. Upon reflection or transmission, a rotation of the plane of polarization occurs through the Kerr effect or the Faraday effect, respectively. The direction and amount of rotation is determined by the orientation of the magnetic vector of the film portion. Light coming from the film is then analyzed by an analyzer oriented to pass a maximum intensity for one extreme of rotation and a minimum intensity for the other extreme. The analyzed light is fed into a photodetector to measure its intensity. Information stored as the magnetization direction of the first portion is translated into an electrical output whose magnitude is dependent upon the analyzed light intensity. Information stored on the film may be erased by heating the entire film above the Curie temperature and cooling in the presence of a strong magnetic field. The film is then ready for reuse.

Some schemes for utilizing Curie point writing use a heated stylus for the writing. This heated stylus severely limits the bit density because of its physical size. The bit density and writing rate are also severely limited because of the necessary mechanical movement of either the stylus or the magnetic film before the next bit of information can be recorded. The stylus cannot be used for readout. Other prior art systems utilize an electron beam for Curie point writing. This beam increases the usable bit density and the writing rate, but it is severely limited by the necessity of enclosing the system within a vacuum for practical use. The electron system can utilize the same source for readout, but disadvantages are again encountered because of the practical necessity of operating in a vacuum and because of the complex equipment required.

The present invention provides a system for Curie point writing on magnetic film, and readout of information so written, utilizing a single coherent light source for both read and write functions. In the present invention, a coherent light beam is digitally modulated or attenuated by an information signal. By "digital modulation" it is meant that modulation of the beam intensity is in two or more discrete increments rather than in continuous variations. The attenuated beam is focused on a first portion of a thin magnetic film. When the modulator allows maximum energy to reach the film, the incident energy is sufficient to raise the temperature of the first portion above the Curie point. Upon cooling, the first portion switches its magnetic direction to an alignment anti-parallel to that of a surrounding portion. When the modulator or attenuator diminishes the transmitted intensity of the laser beam, the light energy incident the film is insufficient to cause a change in the alignment of the magnetic direction of the first portion. Storage of more than one bit of information is obtained by insertion of means for deflecting the light beam into the light path between the source and the magnetic film. The deflector may be synchronized with the modulator and can be electrically operated. Readout is accomplished using the same basic system. The coherent light is linearly polarized before striking the magnetic film. It is also attenuated to a value insufficient to raise the film portion being interrogated to a temperature above the Curie point. A photo responsive device may be positioned to intercept reflected or transmitted light as desired. In either case, the beam leaving the magnetic film is passed through a properly oriented analyzer into an intensity detector. The intensity detector converts the variations in incident light intensity to a correspondingly varying electrical output. The electrical output of the detector is used to operate the next device in the system.

The system of the present invention overcomes many difficulties of the prior art. For example, no vacuum is required for operation. Higher bit densities, such as $2.5 \times 10^5$ bits per square centimeter, are obtainable. The system is capable of operation at a writing rate of $10^6$ bits per second and a readout rate of $10^9$ bits per second. An additional advantage of the system is the fact that a low power continuous wave gas laser can provide the light beam. Use of such a low power laser significantly reduces the power necessary to operate the system.

The present invention will be more fully understood when taken in conjunction with the following detailed description and drawings wherein:

FIGURE 1 is a block diagram of an information storage and retrieval system utilizing the invention; and FIGURE 2 is a diagrammatic representation of a system utilizing the invention.

Referring now to FIGURE 1, the system of the invention is shown in block diagram. Coherent light source means, shown as laser 10, provides a beam of coherent light 11. Coherent light is necessary to obtain the advantages of the present invention because it can be focused to a diffraction limited (i.e. very small) spot. Light beam 11 then enters attenuating means, here shown as modulator 12, which varies the transmitted beam intensity in response to an input signal. The beam 11 then enters deflecting means, shown as deflector 13, which deflects the modulated beam to a desired portion of a thin magnetic film 14. A synchronizer 15 controls the operation of modulator 12 and deflector 13 in response to input applied to the synchronizer. Intensity detecting means, here shown as detector 16, intercepts beam 11 after it leaves magnetic film 14.

In operation, laser 10 emits a coherent beam 11. Information fed into synchronizer 15 synchronizes the action of modulator 12 and deflector 13 causing digital modulation of beam 11 and deflection of the beam to a chosen portion of magnetic film 14. The construction of deflector 13 allows either sequential or random access to portions of magnetic film 14. Modulator 12 is designed to digitally modulate beam 11. At a first extreme, modulator 12 allows the maximum intensity of beam 11 to be transmitted to the magnetic film. The maximum beam intensity is sufficient to raise a first portion of the film to a temperature above the Curie temperature. At a second extreme, modulator 12 attenuates the beam to its minimum value and the beam intensity reaching the first portion of magnetic film 14 is not sufficient to raise its temperature to the Curie temperature. Therefore, when the modulator is at the first extreme it causes reversal of the magnetization direction of the portion, and when the modulator is at the second extreme it will allow the magnetic direction of the portion to remain unchanged.

Readout operation of the system is accomplished by linearly polarizing beam 11 before incidence on magnetic film 14. This may be accomplished either before the beam leaves laser 10, as it passes through modulator 12, or as it passes through deflector 13. The intensity of beam 11 is also reduced sufficiently to avoid inadvertently switching the magnetic direction of the portion of magnetic film 14 being interrogated. This is accomplished by reducing the output of laser 10, adjusting modulator 12 to the second extreme, or inserting an additional attenuator in the system. The polarized beam 11 striking magnetic film 14 is then either transmitted or reflected to a detector. In FIGURE 1, a transmitted beam is shown reaching detector 16. Readout from transmitted light utilizes the Faraday rotation of the plane of polarization of the transmitted light. Detector 16 includes an analyzer positioned to pass different intensities depending upon the direction and amount of rotation of the plane of polarization of the light. Detector 16 converts the light intensity variations to an electrical signal output. Alternately, detector 16 may be placed on the same side of magnetic film as laser 10 in a position to intercept a beam reflected from the surface of the magnetic film 14. When the reflected light is used, the rotation of the plane of polarization is known as the Kerr effect and causes the analyzer and detector to respond in substantially the same manner as it does in FIGURE 1.

Many types of lasers are suitable for use as the coherent source. Among these are continuous wave gas lasers and continuous wave solid state dielectric lasers. 100 milliwatts of power output is satisfactory for producing an operable system. Modulator 12 can be a mechanical shutter, an electro-optical Kerr cell, an absorption type modulator, a magneto-optical modulator or an internal laser modulator. Each of these modulators is well known in the art and will not be further described. Deflector 13 may be a mirror deflection system or an array of electro-optical cells and birefringent crystals. The thin magnetic film may be constructed of Permalloy, a magnetic nickel-iron alloy of nominal composition 80% Ni, balance Fe, or of a one-to-one atomic ratio intermetallic manganese-bismuth magnetic film. The polarizers and analyzers used in the system are well known in the art and will not be further described. The detector 16 can be any photodetector responsive to the wavelength of the laser light. Such photodetectors are well known in the art.

FIGURE 2 diagrammatically illustrates a particular system utilizing the Kerr effect. A continuous wave gas laser 20, which may contain helium-neon, for example, is pumped by a pumping supply 21. The laser emits beam 22 which passes through a polarizer 23, a Kerr cell 24, and an analyzer 25. The latter three elements make up the light beam modulator. The Kerr cell may be constructed of potassium dihydrogen phosphate (KDP). This type of electro-optic cell is well known. Modulated beam 22 then enters an array of Kerr cells and birefringent crystals here shown as KDP cells 26, 28, 29, 32, 33, 34 and 35, and calcite crystals 27, 30, 31, 36, 37, 38 and 39. This array constitutes a beam deflection system. To obtain deflection in both the vertical and horizontal directions, half of the units in the array are rotated by 90°. It should be understood that the array shown can be expanded further by merely adding Kerr cells and birefringent crystals in a continued doubling pattern. A master square wave generator 40 provides a synchronizing pulse for operating Kerr cell 24 and the Kerr cell-birefringent crystal array. The square wave is fed into a beam deflecting circuit 41 which determines the vertical and horizontal deflection which will be utilized. The square wave is also fed into an input gate 42 and a modulator gate 43. An information input signal is fed into input gate 42. The signal is fed from input gate 42 to modulator gate 43 through an input circuit 44. The particular circuitry used in the circuits just described is standard and will not be further described. The modulated deflected beam strikes a thin magnetic manganese-bismuth film 45. Interaction of the beam with the film is identical to that described with regard to FIGURE 1.

During the readout portion of the cycle, the pumping supply 21 may be regulated to decrease the output of laser 20 to a level insufficient to affect the magnetization direction of the portion interrogated on film 45. The reflected portion of beam 22 is passed through analyzer 46 to photodetector 47. Both the analyzer 46 and the photodetector 47 are elements well known in the art and will not be further described. The electrical output of photodetector 47 may be used to operate any number of other devices. Photodetector 47 yields a varying signal responsive to the stored information in the same manner as described with reference to FIGURE 1.

It is readily apparent to those skilled in the art that many modifications of the present invention are possible. It should therefore be understood that the invention is not to be limited by the embodiments shown, but only by the scope of attached claims.

We claim:

1. In an information storage system of the Curie point writing type wherein bits of information are stored in a magnetic storage medium comprising a ferromagnetic material by temporarily heating various predetermined portions of material to a temperature above the Curie temperature whereby the magnetization direction of heated portions after cooling is altered with respect to unheated portions, the improvement comprising:

a laser means for providing light energy sufficient to heat said predetermined portions of the material to a temperature above the Curie temperature, and light directing means for selectively directing the light energy to various of said predetermined portions of material to be heated in accordance with the information to be stored.

2. The combination of claim 1 wherein:

the light directing means is a deflecting means for selectively deflecting the light energy.

3. The combination of claim 1 wherein:

the ferromagnetic material is manganese bismuth, and the laser means is a continuous wave laser.

4. The combination of claim 1 including:

means for selectively attenuating the light from the laser means to an energy level insufficient to heat certain of the selected portions of material to a temperature above the Curie temperature in order to effect non-destructive readout.

5. The combination of claim 4 including:

means for analyzing the attenuated light energy after it encounters the ferromagnetic material and determining its energy intensity which is controlled by the magnetization direction of the material.

6. The combination of claim 5 wherein:

the ferromagnetic material is manganese bismuth, and the laser means is a continuous wave laser.

References Cited

UNITED STATES PATENTS

| | | | |
|---|---|---|---|
| 3,175,196 | 3/1965 | Lee et al. | 346—74 |
| 3,059,538 | 10/1962 | Sherwood et al. | 340—174.1 |
| 2,984,825 | 5/1961 | Fuller et al. | 340—174.1 |
| 2,915,594 | 12/1959 | Burns et al. | 179—100.2 |

OTHER REFERENCES

Mayer, Ludwig: "Magnetic Writing with an Electron Beam," Journal of Applied Physics, vol. 29, No. 10, October 1958.

TERRELL W. FEARS, *Primary Examiner.*

BERNARD KONICK, *Examiner.*

A. I. NEUSTADT, *Assistant Examiner.*